(12) United States Patent
Dhanda

(10) Patent No.: US 7,149,740 B2
(45) Date of Patent: Dec. 12, 2006

(54) USING A COMMON LINK FIELD KEY

(75) Inventor: Dilip S. Dhanda, San Jose, CA (US)

(73) Assignee: Symmetricom, Inc., San Jose, CA (US)

( * ) Notice: Subject to any disclaimer, the term of this patent is extended or adjusted under 35 U.S.C. 154(b) by 248 days.

(21) Appl. No.: 10/163,251

(22) Filed: Jun. 5, 2002

(65) Prior Publication Data
US 2003/0195892 A1 Oct. 16, 2003

Related U.S. Application Data

(60) Provisional application No. 60/367,536, filed on Mar. 26, 2002.

(51) Int. Cl.
G06F 17/30 (2006.01)
(52) U.S. Cl. .......................... 707/100; 707/10
(58) Field of Classification Search .............. 707/6–10, 707/100, 103 R, 101–104.1, 200; 709/217–219, 709/223, 224, 220, 228, 226, 230, 236; 711/147
See application file for complete search history.

(56) References Cited

U.S. PATENT DOCUMENTS

| 5,764,955 | A | * | 6/1998 | Doolan | 709/223 |
| 5,822,569 | A | * | 10/1998 | McPartlan et al. | 703/21 |
| 5,931,911 | A | * | 8/1999 | Remy et al. | 709/223 |
| 6,009,431 | A | * | 12/1999 | Anger et al. | 707/10 |
| 6,101,502 | A | * | 8/2000 | Heubner et al. | 707/103 R |
| 6,101,538 | A | * | 8/2000 | Brown | 709/223 |
| 6,175,866 | B1 | * | 1/2001 | Holloway et al. | 709/223 |
| 6,260,062 | B1 | * | 7/2001 | Davis et al. | 709/223 |
| 6,631,406 | B1 | * | 10/2003 | Pantages et al. | 709/223 |

FOREIGN PATENT DOCUMENTS

| EP | 1172967 A2 | 1/2002 |
| WO | WO 00/76129 A1 | 12/2000 |

OTHER PUBLICATIONS

International Search Report for PCT/US03/08752 mailed Aug. 20, 2003.

* cited by examiner

Primary Examiner—Greta L. Robinson
Assistant Examiner—Jacques Veillard
(74) Attorney, Agent, or Firm—John Bruckner PC

(57) ABSTRACT

Systems and methods are provided for interfacing between an element management system and a network management system in a network. A method includes associating a plurality of physical elements of a network with at least one element management system; providing a network management system; and providing a generic management information base interfacing between the at least one element management system and the network management system. The generic management information base includes a first data structure and a second data structure, the first data structure including at least one attribute common to each of the plurality of physical elements associated with the element management system, the second data structure including at least one value representing at least one of the plurality of physical elements. The first data structure and the second data structure are associated using a common link field and the first data structure and the second data structure are generic.

27 Claims, 3 Drawing Sheets

USING A COMMON LINK FIELD KEY

CROSS-REFERENCE TO RELATED APPLICATION

This application is related to, and claims a benefit of priority under 35 U.S.C. 119(e), copending U.S. Ser. No. 60/367,536, filed Mar. 26, 2002, the entire contents of which are hereby expressly incorporated by reference for all purposes.

BACKGROUND OF THE INVENTION

1. Field of the Invention

The invention relates generally to the field of network management. More particularly, the invention relates to utilizing a management information base to monitor, optimize, and adjust the performance of a network.

2. Discussion of the Related Art

Networks of computer systems exist all over the world to facilitate the transportation of data. Networks consist of physical network elements such as computers, communication apparatuses, terminal equipment, and communication channels interconnected in various manners. Network operations centers (NOCs) in the telecom industry all over the world use Network Management Systems (NMS) to monitor e.g. for faults, quality of service, etc. configure, and provision their communications equipment and network. An Element Management System (EMS) is similar in role to an NMS except that an EMS manages network elements of a specific type from a specific telecom equipment supplier or vendor.

An EMS is usually supplied by the vendor or supplier of the network elements with which it is compatible. EMS usually focus on a sub-network and apart from fault monitoring, their main functional focus is on configuration, provisioning and problem resolution of the specific sub-network associated with the EMS. NMS are usually placed above EMS in the management hierarchy. NMS focus mainly on the complete network with a functional focus on fault monitoring, trouble ticketing, etc.

The need for Operation Support Systems (NMS/EMS) is extremely critical to the telecommunication industry, and this need will grow as telecommunications networks expand all over the world. ITU-T, the international telecommunications standards body, defines the functional model of a NMS/EMS in their FCAPS (Faults, Configuration, Accounting, Performance and Security) standards.

Because the EMS and the NMS work in tandem to manage the network there must be a method to model the network which will represent an EMS and its corresponding sub-network to the NMS. Management Information Base (MIB) refers to how information about elements in a network are structured and modeled. MIB thus creates the most critical base on which applications like the NMS and EMS are modeled.

One unsatisfactory approach to modeling the network has been defining each set of network elements with its own proprietary MIB. This arrangement means that anytime a new EMS is to be integrated into an existing NMS the NMS must be modified to accommodate the new MIB which represents the EMS and its physical network elements. This makes the process of creating new EMS and NMS solutions very complex, time consuming, and costly to create and integrate with other systems. The same type of disadvantage is seen when a new type of network element is added to the list of network element types managed by an EMS.

Heretofore, the requirements of a generic management information base which can define any network element supplied by any vendor and which can encompass all the information and data for each of the network element types covered by the management information base referred to above have not been fully met. What is needed is a solution that simultaneously addresses all of these requirements.

SUMMARY OF THE INVENTION

There is a need for the following aspects of the invention. Of course, the invention is not limited to these aspects.

According to one aspect of the invention, a method includes, associating a plurality of physical elements of a network with at least one element management system; providing a network management system; and providing a generic management information base interfacing between the at least one element management system and the network management system, wherein the generic management information base includes a first data structure and a second data structure, the first data structure including at least one attribute common to each of the plurality of physical elements associated with the element management system, the second data structure including at least one value representing at least one of the plurality of physical elements.

According to another aspect of the invention an apparatus includes, a network including a plurality of physical elements; at least one element management system associated with at least one of the plurality of physical elements; a network management system; and at least one management information base interfacing between the at least one element management system and the network management system, the at least one management information base configured to interface between each of the at least one element management systems and the network management system, characterized in that the at least one management information base includes a generic management information base having a first data structure and a second data structure, the first data structure including at least one attribute common to each of the plurality of physical elements associated with the at least one element management system, and the second data structure including at least one value representing at least one of the plurality of physical elements.

According to yet another aspect of the invention a method includes providing a network including a plurality of physical elements associated with at least one element management system; representing the network with at least one generic management information base, wherein the generic management information base includes a first data structure and a second data structure; the first data structure including at least one attribute common to each of the plurality of physical elements associated with the at least one element management system, the second data structure including at least one value representing at least one of the plurality of physical elements; and populating the at least one generic management information base with at least one value pertaining to each of the plurality of physical elements.

According to still another aspect of the invention a method includes, providing a network including a plurality of physical elements associated with at least one element management system; providing a network management system; providing a generic management information base interfacing between the at least one element management system and the network management system, wherein the generic management information base includes a first data structure and a second data structure, the first data structure including at least one attribute common to each physical element associated with the element management system, the second data structure including at least one value representing at least one physical element; modeling at least one set of runtime data corresponding to at least one of the plurality of physical elements; utilizing the network management system to read the at least one set of runtime data and improve the performance of the network; and updating the at least one set of runtime data to reflect the current state of the network.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In general, the invention can include generic representations of network elements and methods of representing a variety of network elements with a generic management information base. Additionally, the invention can include a generic management information base used to interface between element management systems and a network management system, and helping to monitor, optimize, and manage the network that it represents.

The invention can include interfacing between one, or more than one element management system(s) and one, or more than one, network management system(s) with a generic management information base which is capable of defining one, more than one, or all network element(s) supplied by one, more than one, or all vendor(s). The invention can include a machine and/or a program adapted to implement the aforementioned generic management information base. The invention can include a method for managing, optimizing, and/or adjusting a network using the aforementioned generic management information base. The invention can include a system utilizing a generic management information base containing two data structures, the first data structure including at least one attribute common to each physical element of the network associated with an element management system, and the second data structure including at least one value representing at least one physical element of the network. The invention can include methods of utilizing the aforementioned generic management information base to manage, monitor, and/or optimize the performance of a network.

Figure 1:
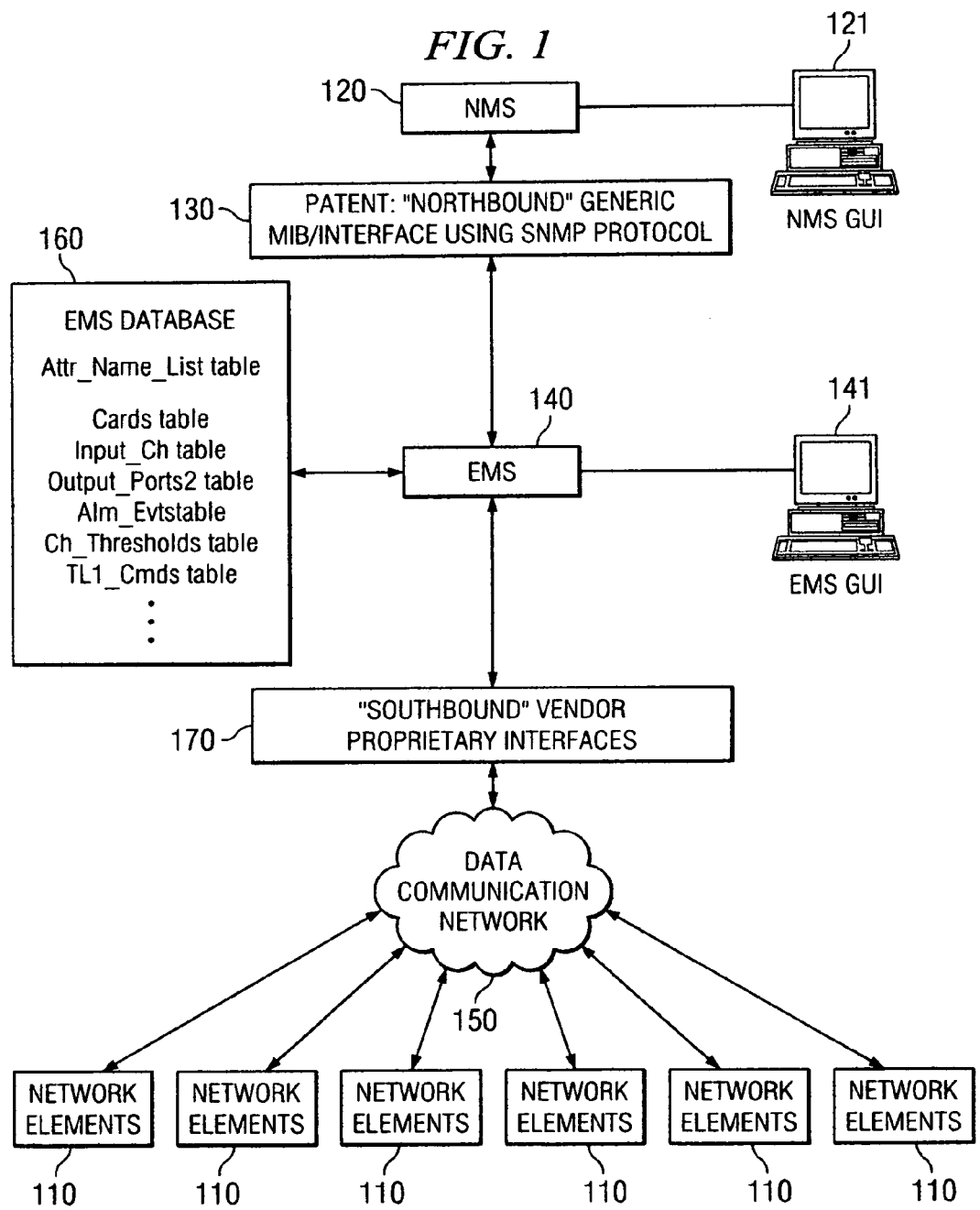
FIG. 1 illustrates the architecture of one embodiment of the system and method of the invention.

Turning to FIG. 1 one embodiment of the architecture of the present invention is represented. A data communications network 150 is an arrangement that allows transmission of data from one computer system or device to another computer system or device. A data communications network 150 is composed of physical network elements 110 which allow and facilitate the transmission of this data. These physical elements 110 are items such as broadband equipment, synchronization equipment, SONET transmission equipment, loop carriers, switching equipment, cross-connects, customer-premises equipment, internetworking devices, routers, MUXs, networking equipment, bridges, and the like.

Element management systems (EMS) 140 manage those physical network elements 110 associated with the EMS, focusing on sub-networks, fault monitoring, configuration, provisioning, problem resolution, etc. EMS 140 are usually supplied by the vendor or supplier of the physical elements 110, and usually manage physical network elements 110 of a specific type from a specific telecom equipment supplier or vendor. Often, each EMS 140 interfaces with the physical network elements 110 under its management using a proprietary interface 170 which is provided by the vendor of both the EMS 140 and the physical network elements 110 which the EMS manages. Often times EMS 140 provide graphical user interfaces (GUI) 141 so a technician or operator can monitor operation of the physical network elements 110 associated with that particular EMS.

Network management systems (NMS) 120 are similar to EMS 140 in that they both monitor for faults, functionality etc. In contrast with EMS 140 however, NMS 120 focus mainly on the complete network, and are usually placed above EMS in the management hierarchy. NMS 120 are also often times accompanied by GUIs so a technician or operator can monitor operation of the network associated with the NMS.

Telecommunications Management Network (TMN) is defined in the ITU-T Recommendation M.3010, "Principles for a Telecommunications Management Network." This standard provides an architectural framework for the administration, operation, and management of telecommunications networks and services. The architecture includes five logical management layers: Network Element Layer (NEL), Element Management Layer (EML), Network Management Layer (NML), Service Management Layer, and Business Management Layer. Management functionality is grouped into five management functional (also referred as FCAPS) areas: Fault Management, Configuration Management, Accounting Management, Performance Management and Security Management.

ISDN Reference Model [ITU-T I.320] divides protocol stacks in three planes (U, C, and M). Planes divide the protocol stacks vertically, as layers divide them horizontally. Management M-plane, messages carry information about administrative activities (FCAPS). Activities which providers or managers of a network wish to perform on any type of network element i.e. any telecommunications or networking equipment.

Standard M-plane protocols include:

Common Management Information Protocol (CMIP [ITU-TX.710, X.711])

Transaction Language-1 (TL-1[TR 62, TR 831, TR 1093, SR 2723])

Simple Network Management Protocol (SNMP [RFC 1441, RFC 1448])

MIB (Management Information Base) refers to how network element information is structured and modeled. MIB thus creates the most critical base on which applications (like NMS and EMS) and processes are created. CMIP, TL-1 and SNMP are examples of formal protocols to formally describe the MIB i.e. the structure and information model of network elements. In one embodiment of the invention a generic MIB 130 is provided to interface between EMS 140 and a corresponding NMS 120. Because the MIB 130 is generic it can be used to represent every type of network element that an EMS would possibly manage.

This means that the same MIB will work for different types of hardware e.g. ymmetricom's DCDs, TimeSource boxes, TimeHubs and also for example, Datum's hardware like TSG3800, PRR10, SSU2000, etc. This also means that the same MIB will work for, or will apply to, any type of network element i.e. any telecommunications or networking equipment, for example broadband equipment, synchronization equipment, SONET transmission equipment, loop carriers, switching equipment, cross-connects, customer-premises equipment, internetworking devices, routers, MUXs, networking equipment, bridges, etc.

In one particular embodiment of the present invention, the unique MIB (Management Information Base) 130 structure and the resulting framework and technique is defined using the SNMP protocol (or language), which includes the declarative functional descriptions along with the formal internal object definitions with data structures. Additionally, one embodiment of the present invention contains a database 160 which represents the structure and composition of the EMS with which it is interfacing.

Figure 2:
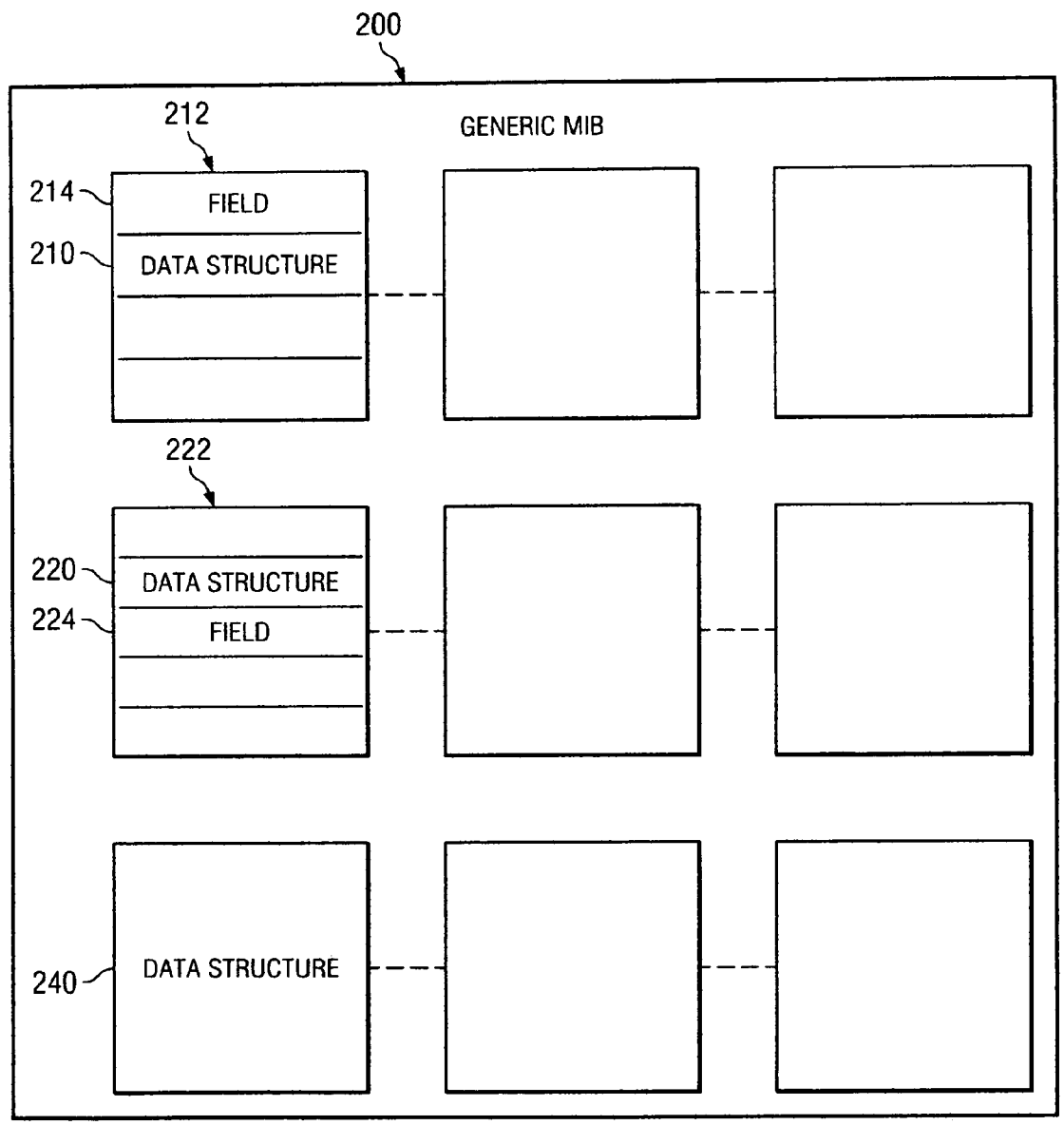
FIG. 2 illustrates one embodiment of the generic management information base of the invention.

Referring now to FIG. 2, the generic management information base (MIB) 200 is represented. The generic MIB 200 is composed of two data structures. A first data structure 210 represents the underlying EMS by including at least one attribute which is common to each of the physical elements which are associated with that particular element management system. Essentially, the first data structure 210 is a generic representation of the physical network elements associated with the particular element management system. In one embodiment, this first data structure is comprised of an "Attr_Name_List" table which holds the names, data types and default values of all the attributes belonging in common to all the physical network elements associated with an element management system. This table is usually static and changes only when a new attribute or parameter is added. In one particular embodiment an entry 212 in this first data structure 210 can be represented by the following:

Attr_Name_List Table

There are four fields to each entry 212 in this data structure 210.

| Field Name | Example Record with Field values | | | | |
|---|---|---|---|---|---|
| Attr_Name_List_Id | DCD-MIS | | | | |
| Attr_Names | SyncMde, | Baud, | Rev_Date, | Model_No, | AlmRpt |
| Attr_Data_Types | Char_String, | Number, | Date, | Char_String, | Time |
| Attr_Default_Values | Auto, | 9600, | July-4-2002, | NA, | 13:24:20 |

1) Attr_Name_List_Id field 214 is the key field to find a unique record in Attr_Name_List table. Hence there can be only one record with field Attr_Name_List_Id equal to "DCD-MIS" as shown in the example.

2) Attr_Names field stores the names of all the attributes (or parameters) contained in the Attr_Name_List_Id, these attributes are common to all physical network elements associated with the element management system identified by Attr_Name_List_Id. The example record shows that there are five attributes contained in "DCD-MIS". The five attributes are "SyncMde, Baud, Rev_Date,Model_No, and AlmRpt".

3) Attr_Data_Types field stores the data types of all the attributes (or parameters) contained in the Attr_Name_List_Id. The example record shows the five data types as "Char_String, Number, Date, Char_String, Time" respectively.

4) Attr_Default_Values field stores the initial default values of all the attributes (or parameters) contained in the Attr_Name_List_Id. The example record shows the five default values as "Auto, 9600, July-4-2002, NA, 13:24:20" respectively.

The generic MIB 200 of the present invention also contains a second data structure 220 that holds actual values of an attribute for a specific physical network element. In fact, there can be any number of other data structures 240 that hold runtime data and actual values of an attribute for a specific physical network element. The names of these tables should relate (but can be any name) to the domain of information that is modeled/stored in them, but all such data tables will have exactly the same generic structure (and field names) as both the second data structure 220 and one another. In one embodiment of the SNMP MIB of the invention there are six such same structure tables called Cards, Input_Ch, Output_Ports2, Alm_Evts, Ch_Thresholds and TL1_Cmds. The common structure and field names will be explained using "Cards" table as an example, one entry 222 in the Cards tables can be represented as:

Cards Table

There are five fields in this table.

| Field Name | Example Record with Field values | | | | |
|---|---|---|---|---|---|
| Ne_Id | 239 | | | | |
| Aid | S0-MIS-1 | | | | |
| Attr_Name_List_Id | DCD-MIS | | | | |
| Attr_Values | Manual, | 1200, | May-9-2002, | R4111D, | 09:20:56 |
| Remarks | John installed a new MIS card in slot 1, on April 7, 2002. | | | | |

1) Ne_Id field identifies a specific physical network element. In the example record we are talking about a specific network element whose unique id is "239". An EMS or NMS can manage hundreds or thousands of network elements.

2) Aid (Access Id) field identifies a specific sub-unit or component (logical or physical) of a specific physical network element. The example record shows that "S0-MIS-1" is a specific sub-unit or component (logical or physical) of a specific Ne_Id equal to "239".

3) Attr_Name_List_Id, the third field 224, links the Cards data structure 220 to the Attr_Name_List table 210 mentioned above. Together the three fields Ne_Id, Aid and Attr_Name_List_Id 224, define the key to find a unique record in the Cards data structure 220. As the key is not just one field, any number of records may exist for the "DCD-MIS" Attr_Name_List_Id, for different access ids (Aid) and for different network elements.

4) Attr_Values field stores the actual values of all the attributes contained in the Attr_Name_List_Id field. To get the names and data types of the attributes contained, cross reference must be made to the Attr_Name_List data structure using the common link field i.e. the Attr_Name_List_Id 224 field. The example record shows the five attribute values as "Manual, 1200, May-9-2002, R4111D, 09:20:56" respectively for Attribute_Names "SyncMde, Baud, Rev_Date, Model_No, AlmRpt". The attributes names are actually stored in Attr_Name_List data structure 210.

5) Remarks field can contain any user remarks for a specific sub-unit or component identified by Aid field, of a specific network element identified by Ne_Id.

Representationally the linking of the first data structure Attr_Name_List_Id 210 and the second data structure the Cards table 220 looks like:

| | | |
|---|---|---|
| | Attr_Name_List_Id Link | |
| | Attr_Name_List Table | |
| | Field Name | Example Record with Field values |
| → | Attr_Name_List_Id 214 | DCD-MIS |
| | Attr_Names | SyncMde, Baud, Rev_Date, Model_No, AlmRpt |
| | Attr_Data_Types | Char_String, Number, Date, Char_String, Time |
| | Attr_Default_Values | Auto, 9600, July-4-2002, NA, 13:24:20 |
| | | |
| | Cards Table | |
| | Field Name | Example Record with Field values |
| | Ne_Id | 239 |
| | Aid | S0-MIS-1 |
| ← | Attr_Name_List_Id 224 | DCD-MIS |
| | Attr_Values | Manual, 1200, May-9-2002, R4111D, 09:20:56 |
| | Remarks | John installed a new MIS card in slot 1, on April 7, 2002. |
| | | |
| | OutPut_Ports2 table | |
| | Field Name | Example Record with Field values |
| | Ne_Id | 102 |
| | Aid | S1-OUTC-16 |
| ← | Attr_Name_List_Id 224 | DCD-MIS |
| | Attr_Values | Auto, 3600, June-3-2001, A2398E, 10:14:25 |
| | Remarks | Patrick installed a new card in slot 1, on June 27, 2001. |
| | | |
| | Input_Ch table | |
| | Field Name | Example Record with Field values |
| | Ne_Id | 988 |
| | Aid | S1-OUTC-4 |
| ← | Attr_Name_List_Id 224 | DCD-MIS |
| | Attr_Values | Forced, 1200, April-15-2001, B9811S, 23:20:56 |
| | Remarks | Maria repaired the card on January 24, 2001. |

Figure 3:
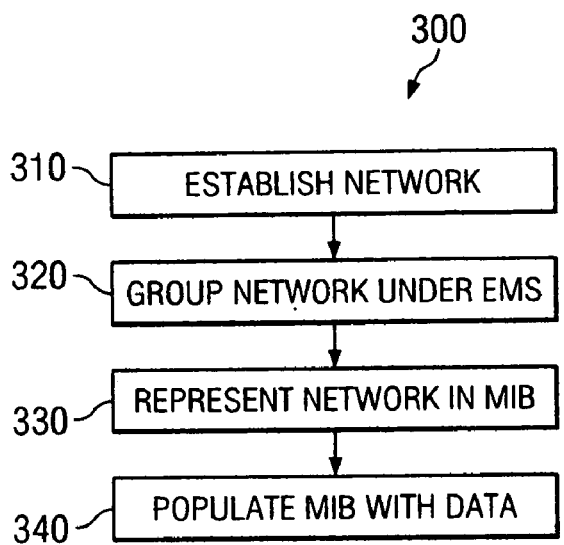
FIG. 3 illustrates a flow diagram of a process that can be implemented utilizing one embodiment of the invention.

Turning now to FIG. 3, a flow diagram 300 which represents an embodiment of one method of the invention is shown. This embodiment allows a network to be represented by a generic management information base (MIB). The first step 310 is the establishing of a physical network. This means creating an architecture and design of a network, and implementing this design using networking hardware such as hubs, switches, routers, interconnects, etc. After the physical network is laid out 310, these physical elements should be grouped under one or more element management systems 320. This is usually done by logical group which consists of physical network elements of a specific type from a specific telecom equipment supplier or vendor. After both the physical network is laid out 310 and a logical network has been determined 320, the network should be represented in a generic management information base 330. This generic MIB, as mentioned above, contains two data structures capable of representing the structure of the network, with the first data structure representing a grouping of elements under each element management system, and the second data structure representing the physical network elements themselves. In one particular embodiment of the invention, these two data structures are themselves generic, each having the same number of fields per entry, and representing the same attributes of a physical network element. Fields can be left blank is an attribute is not applicable.

After this generic management information base is described and implemented 330, which in one embodiment of the invention is done using SNMP, the generic management information base is populated with data which actually represents the physical elements that make up the network 340. In this way an accurate representation of a physical network is created which can be used to interface between the element management systems of a network and the network management systems.

Figure 4:
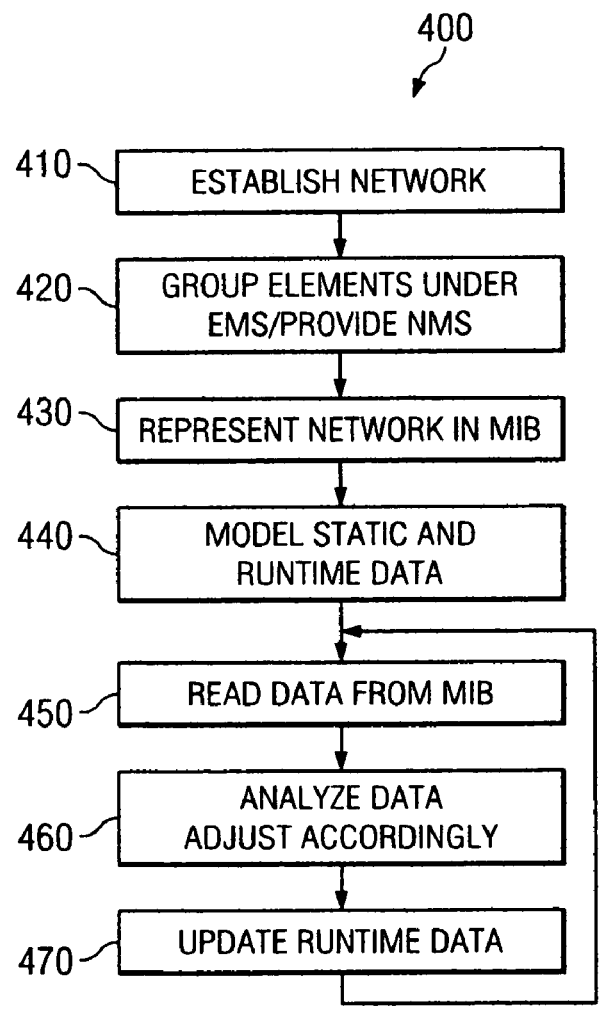
FIG. 4 illustrates a flow diagram of another process which can be implemented utilizing one embodiment of the invention.

FIG. 4 represents one method 400 of the invention in which the generic management information base dynamically represents the network, and is used by a network management system to increase the performance of the network. Again, the first step 410 is the establishing of a physical network. This means creating an architecture and design of a network, and implementing this design using networking hardware such as hubs, switches, routers, interconnects, etc. After the physical network is laid out 410, these physical elements should be grouped under one or more element management systems 420. This is usually done by logical group which consists of physical network elements of a specific type from a specific telecom equipment supplier or vendor Additionally, a network management system should be provided to monitor, optimize, and manage the network of physical elements 420. After both the physical network is laid out 410, a logical network has been determined 420, and a network management system is provided 420, the network should be represented in a generic management information base 430. This generic MIB, as mentioned above, contains two data structures capable of representing the structure of the network, with the first data structure representing a grouping of elements under each element management system, and the second data structure representing the physical network elements themselves. After this generic management information base is described and implemented 430, which in one embodiment of the invention is done using SNMP, the generic management information base is populated with data which actually represents the physical elements that make up the network 440, and runtime values of these same physical elements 440. In this way an accurate representation of a physical network is created which can be used to interface between the element management systems of a network and the network management systems.

During operation of the network, the network management system will read the runtime data which is modeled in the generic management information base 450 using Get Edit Set (GES) procedures. These procedures allow both read and write access to the values representing the physical elements of the network. Using this runtime data which is read from the management information base, the network management system will alter the performance of the network by for example, analyzing the traffic on a network and redirecting the routing, or determining that hardware on the network is malfunctioning etc. 460. This runtime data changes often, and is updated in the generic management information base using the Get, Edit, Set procedures described above 470. The runtime data pertaining to a physical network element may be updated by for example an element management system, a network management system, the network element itself etc.

EXAMPLE

A specific embodiment of the invention will now be further described by the following, nonlimiting example which will serve to illustrate in some detail various features. The following example is included to facilitate an understanding of ways in which the invention may be practiced. It should be appreciated that the example which follows represents an embodiment discovered to function well in the practice of the invention, and thus can be considered to constitute a preferred mode for the practice of the invention. However, it should be appreciated that many changes can be made in the exemplary embodiment which is disclosed while still obtaining like or similar result without departing from the spirit and scope of the invention. Accordingly, the example should not be construed as limiting the scope of the invention.

In one particular embodiment the generic MIB 130 containing a database which represents the structure and composition of the corresponding EMS 160 is described in the SNMP protocol as:

Main MIB

```
TIMEPICTRA-MIB DEFINITIONS ::= BEGIN
IMPORTS
     MODULE-IDENTITY,OBJECT-IDENTITY, NOTIFICATION-TYPE,IpAddresss FROM SNMPv2-SMI snmpMgmt FROM SYMMETRICOM-SMI;

timePictra    MODULE-IDENTITY
     LAST-UPDATED    "200101031000"
     ORGANIZATION    " Symmetricom Inc."
     CONTACT-INFO    ""
     DESCRIPTION     "This is a module definition for clock devices.
              This provides the OBJECT-IDENTITY for the
              different subtrees present under  clockdevice"

REVISION         "200012151700"

DESCRIPTION    " This is the initial version"
     ::= {snmpMgmt 1}

-- network provides a conceptual view of the the network.

network      OBJECT-IDENTITY
```

```
           STATUS          current
           DESCRIPTION     " Network provides a conceptual view of the the
                           network"
           ::= { timePictra 1 }

--timePictraDescription attribute timePictraDescription OBJECT-TYPE
           SYNTAX          OctetString
           MAX-ACCESS      read-write
           STATUS          current
           DESCRIPTION     "This attribute gives the description about the
                           timePictra system"
           ::= { timePictra 2 }

--networkDescription attribute networkDescription    OBJECT-TYPE
           SYNTAX          OctetString
           MAX-ACCESS      read-write
           STATUS          current
           DESCRIPTION     "This attribute gives the description about the
                           network"
           ::= { network 1 } eventProbableCauseMap      OBJECT-TYPE
           SYNTAX          OctetString
           MAX-ACCESS      read-write
           STATUS          current
           DESCRIPTION     "This attribute provides a mapping between event
                           condtion types and the corresponding probable
                           cause values.During the initialization agent
                           reads the configuration file and initailize this
                           variable.
                           During the trap processing,agent query this
                           attribute to fill the value of the probableCause
                           variable.Manager can also change this mapping by
                           appropriately modifying the value of this
                           variable.When the agent goes down the modified values     will be
written into the configuration file."
           ::= { network 2 } alarmEventTypeMap     OBJECT-TYPE
           SYNTAX          OctetString
           MAX-ACCESS      read-write
```

```
STATUS               current
DESCRIPTION          "This attribute provides a mapping between event
             condtion types and the corresponding
             alarmEventType values.During the initialization
             agent reads the configuration file and
             initailize this variable.
             During the trap processing,agent query this
             attribute to fill the value of alarmEventType
             variable.Manager can also change this mapping by
             appropriately modifying the value of this
             variable.When the agent goes down the modified values        will be
written into the configuration file."
    ::= { network 3 } trapSeverityMap         OBJECT-TYPE
    SYNTAX              OctetString
    MAX-ACCESS      read-write
    STATUS              current
    DESCRIPTION         "This attribute gives the mapping between
             severity values maintained by the management
             syatem and agent.During the initialization agent
             reads the configuration file and initailize this
             variable.
             During the trap processing,agent query this
             attribute to fill the value of trapSeverity
             variable.Manager can also change this mapping by
             appropriately modifying the value of this
             variable.When the agent goes down the modified values        will be
written into the configuration file."

::= { network 4 }

--getAllActiveAlarms attribute getAllActiveAlarms      OBJECT-TYPE
    SYNTAX              OctetString
    MAX-ACCESS       read-only
    STATUS              current
    DESCRIPTION         "To emit traps for all active alarms present in
                     current alarms.A get request on this attribute
             acts as trigger for the agent to retreive all
             active alarms present in current_alarms table
             and emit SNMP traps corresponding to each of the
             alarms"
    ::= { network 5 }
```

```
syncAlarmsFromAllNE   OBJECT-TYPE
    SYNTAX          OctetString
    MAX-ACCESS      read-only
    STATUS          current
    DESCRIPTION     "To sync the alarms from all NE's.
                    A get request on this attribute
            acts as trigger for the agent to insert the
            neId's of all NE's present in the nes table
                        into ALARM_SYNC_NES table in the TimePictra
                        database, which intern triggers the alarm
                        syncing"
    ::= { network 6 }

--nesTable nesTable OBJECT-TYPE
    SYNTAX    SEQUENCE OF NesTableEntry
    MAX-ACCESS  not-accessible
    STATUS    current
    DESCRIPTION "The nes table contains the administrative details
            of network elements. This maps to MV_nes table of DB"
    ::= {network 7} nesTableEntry   OBJECT-TYPE
    SYNTAX    NesTableEntry
    MAX-ACCESS  not-accessible
    STATUS    current
    DESCRIPTION "This represents a conceptual row of
            nesTable "
    INDEX    {
            neId
        }
    ::= {nesTable 1}

NesTableEntry ::= SEQUENCE{
        neId                INTEGER,
        clli                OctetString,
        managed             OctetString,
        available           OctetString,
        address             OctetString,
        aligned             OctetString,
        commport            OctetString,
        neType              OctetString,
        protocol            OctetString,
        sid                 OctetString,
        user                OctetString,
        passwd              OctetString,
```

```
    remarks                    OctetString,
                        fdn                                OctetString,
                        parentFdn                          OctetString,
                        groupId                            OctetString,
    lastAttributeChanged       OctetString,
    valueOfLastAttributeChanged OctetString,
    aidOfLastAttributeChanged   OctetString,
    nameOfRequestedAttribute    OctetString,
    valueOfRequestedAttribute   OctetString,
    aidOfRequestedAttribute     OctetString,
    getAllActiveAlarmsOnNE      OctetString,
            forceUnlockNE              OctetString,
                    syncAlarmsFromNE        OctetString
}
```

```
neId       OBJECT-TYPE
   SYNTAX    INTEGER (0..10000)
   MAX-ACCESS  read-only
   STATUS    current
   DESCRIPTION "This attribute uniquely identifies different NEs"
   ::= { nesTableEntry 1 } clli       OBJECT-TYPE
   SYNTAX    OctetString
   MAX-ACCESS  read-only
   STATUS    current
   DESCRIPTION "This attribute gives info about the selection name
         of the Network Element"
   ::= { nesTableEntry 2 } managed    OBJECT-TYPE
   SYNTAX    OctetString
   MAX-ACCESS  read-only
   STATUS    current
   DESCRIPTION "This attribute gives info whether the Network Element
         is managed or not"
   ::= { nesTableEntry 3 } available  OBJECT-TYPE
   SYNTAX    OctetString
   MAX-ACCESS  read-only
   STATUS    current
   DESCRIPTION "This attribute gives info whether the Network Element
         is available in network or not"
   ::= { nesTableEntry 4 }
```

```
address     OBJECT-TYPE
  SYNTAX    OctetString
  MAX-ACCESS  read-only
  STATUS    current
  DESCRIPTION "This attribute holds the ip_address
       of the Network Element"
  ::= { nesTableEntry 5 } aligned     OBJECT-TYPE
  SYNTAX    OctetString
  MAX-ACCESS  read-only
  STATUS    current
  DESCRIPTION "This attribute gives info whether the Network Element
       is aligned with dataBase or not"
  ::= { nesTableEntry 6 } commport    OBJECT-TYPE
  SYNTAX    OctetString
  MAX-ACCESS  read-only
  STATUS    current
  DESCRIPTION "This attribute gives info about the port number
       through which the communication with the NE is done"
  ::= { nesTableEntry 7 } neType     OBJECT-TYPE
  SYNTAX    OctetString
  MAX-ACCESS  read-only
  STATUS    current
  DESCRIPTION "This attribute gives the type of the Network Element"
  ::= { nesTableEntry 8 } protocol    OBJECT-TYPE
  SYNTAX    OctetString
  MAX-ACCESS  read-only
  STATUS    current
  DESCRIPTION "This attribute has information about which protocol is
       used to communicate with NE's"
  ::= { nesTableEntry 9 } sid       OBJECT-TYPE
  SYNTAX    OctetString
  MAX-ACCESS  read-only
  STATUS    current
  DESCRIPTION "This attribute gives system identifier of the NE's"
  ::= { nesTableEntry 10 } user      OBJECT-TYPE
  SYNTAX    OctetString
```

```
    MAX-ACCESS  read-only
    STATUS      current
    DESCRIPTION "This attribute gives info about the user of the NE's"
    ::= { nesTableEntry 11 } passwd      OBJECT-TYPE
    SYNTAX      OctetString
    MAX-ACCESS  read-only
    STATUS      current
    DESCRIPTION "This attribute gives password related info about
                 the Network Element"
    ::= { nesTableEntry 12 } remarks     OBJECT-TYPE
    SYNTAX      OctetString
    MAX-ACCESS  read-only
    STATUS      current
    DESCRIPTION "This attribute gives information about users remarks
                 pertaining to NE"
    ::= { nesTableEntry 13 } fdn         OBJECT-TYPE
    SYNTAX      OctetString
    MAX-ACCESS  read-only
    STATUS      current
    DESCRIPTION "This attribute gives fdn of the NE from NES Table"
    ::= { nesTableEntry 14 } parentFdn   OBJECT-TYPE
    SYNTAX      OctetString
    MAX-ACCESS  read-only
    STATUS      current
    DESCRIPTION "This attribute gives paren_fdn of the NE from NES Table"
    ::= { nesTableEntry 15 } groupId     OBJECT-TYPE
    SYNTAX      OctetString
    MAX-ACCESS  read-only
    STATUS      current
    DESCRIPTION "This attribute gives group_id of the NE from NES Table"
    ::= { nesTableEntry 16 } lastAttributeChanged  OBJECT-TYPE
    SYNTAX                OctetString
    MAX-ACCESS            read-only
    STATUS                current
    DESCRIPTION           "This attribute gives info about the last
                           modified attribute"
```

::= { nesTableEntry 17 } valueOfLastAttributeChanged     OBJECT-TYPE
    SYNTAX                      OctetString
    MAX-ACCESS                  read-only
    STATUS                      current
    DESCRIPTION                 "This attribute gives value of the
        last modified attribute"
    ::= { nesTableEntry 18 } aidOfLastAttributeChanged       OBJECT-TYPE
    SYNTAX                      OctetString
    MAX-ACCESS                  read-only
    STATUS                      current
    DESCRIPTION                 "This attribute gives the aid of the
        last modified attribute"
    ::= { nesTableEntry 19 } nameOfRequestedAttribute    OBJECT-TYPE
    SYNTAX                      OctetString
    MAX-ACCESS                  read-only
    STATUS                      current
    DESCRIPTION                 "This attribute gives name of the last
        requested attribute"
    ::= { nesTableEntry 20 } valueOfRequestedAttribute   OBJECT-TYPE
    SYNTAX                      OctetString
    MAX-ACCESS                  read-only
    STATUS                      current
    DESCRIPTION                 "This attribute gives the value of
        the last Requested attribute"
    ::= { nesTableEntry 21 } aidOfRequestedAttribute     OBJECT-TYPE
    SYNTAX                      OctetString
    MAX-ACCESS                  read-only
    STATUS                      current
    DESCRIPTION                 "This attribute gives the aid of the last
        requested attribute"
    ::= { nesTableEntry 22 } getAllActiveAlarmsOnNE      OBJECT-TYPE
    SYNTAX          OctetString
    MAX-ACCESS          read-only
    STATUS          current
    DESCRIPTION     "To emit notifications for all active
        alarms of secified NE present in

```
                    current alarms table.A get request   on
                    this attribute acts as a trigger for the
                    agent to retreive all active alarms of
                    specified NE, present in current_alarms
                    table and emit SNMP traps corresponding to
                    each of the alarms"
    ::= { nesTableEntry 23 } forceUnlockNE       OBJECT-TYPE
        SYNTAX     OctetString
        MAX-ACCESS  read-only
        STATUS     current
        DESCRIPTION "This attribute acts as a trigger to force unlock.
                    If manager SET fails because NE is locked by others.
                    Then manager can send a get request on this attribute
            to foce lock to be released."
    ::= { nesTableEntry 24 } syncAlarmsFromNE       OBJECT-TYPE
        SYNTAX         OctetString
        MAX-ACCESS     read-only
        STATUS         current
        DESCRIPTION    "To sync the alarms from a specific NE.
                        A get request on this attribute
            acts as trigger for the agent to insert the
            neId of the NE  into
            ALARM_SYNC_NES table in the TimePictra database, which
            intern triggers the alarm syncing for that NE"
    ::= { nesTableEntry 25 }

--cardsTable cardsTable                  OBJECT-TYPE
        SYNTAX      SEQUENCE OF CardsTableEntry
        MAX-ACCESS     not-accessible
        STATUS         current
        DESCRIPTION    "This Table has details about different
                availaible cards in different NE's.It maps to
                MV_cards in DB"
        ::= {network 8} cardsTableEntry             OBJECT-TYPE
        SYNTAX       CardsTableEntry
        MAX-ACCESS      not-accessible
        STATUS         current
        DESCRIPTION     "This represents a conceptual row of
                cardsTable "
```

```
INDEX       {
                cardsNeId,
                        cardsAid,
                cardsAttrListId
                }
    ::= {cardsTable 1}

CardsTableEntry ::= SEQUENCE{
                cardsNeId       INTEGER,
                cardsAid        OctetString,
                cardsAttrListId OctetString,
                cardsAttrValues OctetString,
                        cardsSubAid     OctetString
                } cardsNeId       OBJECT-TYPE
    SYNTAX      INTEGER (0..10000)
    MAX-ACCESS  read-only
    STATUS      current
    DESCRIPTION "This attribute gives info about the unique id
                of the Network Element"
    ::= { cardsTableEntry 1 } cardsAid        OBJECT-TYPE
    SYNTAX      OctetString
    MAX-ACCESS  read-only
    STATUS      current
    DESCRIPTION "This attribute gives info about the access
                identifier of the card"
    ::= { cardsTableEntry 2 } cardsAttrListId OBJECT-TYPE
    SYNTAX      OctetString
    MAX-ACCESS  read-only
    STATUS      current
    DESCRIPTION "This attribute gives info about the
                attrNameListId of the particular card"
    ::= { cardsTableEntry 3 } cardsAttrValues OBJECT-TYPE
    SYNTAX      OctetString
    MAX-ACCESS  read-write
    STATUS      current
    DESCRIPTION "This gives the attributeValues of the card"
    ::= { cardsTableEntry 4 } cardsSubAid     OBJECT-TYPE
```

```
    SYNTAX          OctetString
    MAX-ACCESS      read-only
    STATUS          current
    DESCRIPTION     "This has the coma seperated list of sub aid of
                    the cards"
    ::= { cardsTableEntry 5 }
```

--attributeList Table

```
attributeListTable      OBJECT-TYPE
    SYNTAX              SEQUENCE OF AttributeListTableEntry
    MAX-ACCESS          not-accessible
    STATUS              current
    DESCRIPTION         "The attributeList table holds all the
                    attributeListId's available and corresponding
                    attribute names specific to network elements.This is
                    mapped to mv_attr_name_list table in ther database"
    ::= {network 9} attributeListTableEntry     OBJECT-TYPE
    SYNTAX              AttributeListTableEntry
    MAX-ACCESS          not-accessible
    STATUS              current
    DESCRIPTION         "This represents the conceptual row of the
                    attrNameListTable "
    INDEX               {attributeListId}
    ::= {attributeListTable 1}

AttributeListTableEntry ::= SEQUENCE{
                            attributeListId OctetString,
                                attributeNames OctetString
                            } attributeListId     OBJECT-TYPE
    SYNTAX              OctetString
    MAX-ACCESS          read-only
    STATUS              current
    DESCRIPTION         "This attribute gives info about the attrNameListId's
                    of NE's"
    ::= { attributeListTableEntry 1 } attributeNames      OBJECT-TYPE
    SYNTAX              OctetString
    MAX-ACCESS          read-only
    STATUS              current
    DESCRIPTION         "This gives attribute names "
```

::= { attributeListTableEntry 2 }

--portTable portTable OBJECT-TYPE
    SYNTAX      SEQUENCE OF PortTableEntry
    MAX-ACCESS  not-accessible
    STATUS      current
    DESCRIPTION  "This Table has details about different
          vailaible ports in different NE's.It maps to
          MV_output_ports2 in database"
    ::= {network 10} portTableEntry                OBJECT-TYPE
    SYNTAX      PortTableEntry
    MAX-ACCESS  not-accessible
    STATUS      current
    DESCRIPTION  "This attribute is the conceptual row of the
          portTable "
    INDEX       {
          portNeId,
            portAid,
          portAttrListId
          }
    ::= {portTable 1}

PortTableEntry ::= SEQUENCE{
                portNeId      INTEGER,
                portAid       OctetString,
                portAttrListId   OctetString,
                portAttrValues   OctetString
                } portNeId       OBJECT-TYPE
    SYNTAX      INTEGER (0..10000)
    MAX-ACCESS  read-only
    STATUS      current
    DESCRIPTION  "This attribute gives info about the unique id
          of the Network Element"
    ::= { portTableEntry 1 } portAid        OBJECT-TYPE
    SYNTAX      OctetString
    MAX-ACCESS  read-only

```
        STATUS          current
        DESCRIPTION     "This attribute gives info about the access
                identifier of the port"
        ::= { portTableEntry 2 } portAttrListId    OBJECT-TYPE
        SYNTAX          OctetString
        MAX-ACCESS      read-only
        STATUS          current
        DESCRIPTION     "This attribute gives info about the
                attrNameListId of the particular port"
        ::= { portTableEntry 3 } portAttrValues    OBJECT-TYPE
        SYNTAX          OctetString
        MAX-ACCESS      read-write
        STATUS          current
        DESCRIPTION     "This gives the attributeValues of ports"
        ::= { portTableEntry 4 }

--inputChannelTable inputChannelTable         OBJECT-TYPE
        SYNTAX          SEQUENCE OF InputChannelTableEntry
        MAX-ACCESS      not-accessible
        STATUS          current
        DESCRIPTION     "This Table has details about different
                availaible input channels in different NE's.This
                is mapped to MV_input_ch table in database."
        ::= {network 11} inputChannelTableEntry OBJECT-TYPE
        SYNTAX          InputChannelTableEntry
        MAX-ACCESS      not-accessible
        STATUS          current
        DESCRIPTION     "This attribute is the conceptual row of the
                inputChannelTable "
        INDEX       {
                    ipChannelneld,
                        ipChannelAid,
                    ipChannelAttrListId
                    }
        ::= {inputChannelTable 1}

InputChannelTableEntry ::= SEQUENCE{
                        ipChannelneld        INTEGER,
```

```
            ipChannelAid         OctetString,
            ipChannelAttrListId  OctetString,
            ipChannelAttrValues  OctetString
        } ipChannelneId   OBJECT-TYPE
    SYNTAX      INTEGER (0..10000)
    MAX-ACCESS  read-only
    STATUS      current
    DESCRIPTION "This attribute gives info about the unique id
                of the Network Element"
    ::= { inputChannelTableEntry 1 } ipChannelAid    OBJECT-TYPE
    SYNTAX      OctetString
    MAX-ACCESS  read-only
    STATUS      current
    DESCRIPTION "This attribute gives info about the access
                identifier of the input channel"
    ::= { inputChannelTableEntry 2 } ipChannelAttrListId  OBJECT-TYPE
    SYNTAX      OctetString
    MAX-ACCESS  read-only
    STATUS      current
    DESCRIPTION "This attribute gives info about the
                attrNameListId of the particular inputChannel"
    ::= { inputChannelTableEntry 3 } ipChannelAttrValues  OBJECT-TYPE
    SYNTAX      OctetString
    MAX-ACCESS  read-write
    STATUS      current
    DESCRIPTION "This gives the attributeValues of inputChannel"
    ::= { inputChannelTableEntry 4 }

--almEvtTable almEvtTable     OBJECT-TYPE
    SYNTAX      SEQUENCE OF AlmEvtTableEntry
    MAX-ACCESS  not-accessible
    STATUS      current
    DESCRIPTION "This Table has the details of alarmEvents.This
                is mapped to MV_alm_evts table in database."
```

::= {network 12}

```
almEvtTableEntry OBJECT-TYPE
    SYNTAX      AlmEvtTableEntry
    MAX-ACCESS  not-accessible
    STATUS      current
    DESCRIPTION "This attribute is the conceptual row of the
        almEvtTable "
    INDEX       {
                almEvtNeId,
                                almEvtAid,
                almEvtAttrListId
                }
    ::= {almEvtTable 1}

AlmEvtTableEntry ::= SEQUENCE{
                almEvtNeId          INTEGER,
                almEvtAid           OctetString,
                almEvtAttrListId    OctetString,
                almEvtAttrValues    OctetString
                } almEvtNeId          OBJECT-TYPE
    SYNTAX              INTEGER (0..10000)
    MAX-ACCESS  read-only
    STATUS      current
    DESCRIPTION "This attribute gives info about the unique id
        of the Network Element"
    ::= { almEvtTableEntry 1 } almEvtAid       OBJECT-TYPE
    SYNTAX      OctetString
    MAX-ACCESS  read-only
    STATUS      current
    DESCRIPTION "This attribute gives info about the access identifier
        of the almEvts."
    ::= { almEvtTableEntry 2 } almEvtAttrListId    OBJECT-TYPE
    SYNTAX      OctetString
    MAX-ACCESS  read-only
    STATUS      current
    DESCRIPTION "This attribute gives info about the attrNameListId
        of the almEvts table"
    ::= { almEvtTableEntry 3 } almEvtAttrValues    OBJECT-TYPE
    SYNTAX      OctetString
```

```
        MAX-ACCESS    read-write
        STATUS        current
        DESCRIPTION   "This gives the attributeValues of almEvts"
        ::= { almEvtTableEntry 4 }

--tl1CmdsTable tl1CmdsTable OBJECT-TYPE
        SYNTAX        SEQUENCE OF Tl1CmdsTableEntry
        MAX-ACCESS    not-accessible
        STATUS        current
        DESCRIPTION   "This Table has the details of TL1 commands.This
                      is mapped to MV_tl1_cmds table in database"
        ::= {network 13} tl1CmdsTableEntry OBJECT-TYPE
        SYNTAX        Tl1CmdsTableEntry
        MAX-ACCESS    not-accessible
        STATUS        current
        DESCRIPTION   "This attribute is the conceptual row of the
                      tl1CmdsTable "
        INDEX         {
                        tl1CmdsNeId,
                        tl1CmdsAid,
                        tl1CmdsAttrListId
                      }
        ::= {tl1CmdsTable 1}

Tl1CmdsTableEntry ::= SEQUENCE{
                        tl1CmdsNeId         INTEGER,
                        tl1CmdsAid          OctetString,
                        tl1CmdsAttrListId   OctetString,
                        tl1CmdsAttrValues   OctetString
                      } tl1CmdsNeId      OBJECT-TYPE
        SYNTAX        INTEGER (0..10000)
        MAX-ACCESS    read-only
        STATUS        current
        DESCRIPTION   "This attribute gives info about the unique id
                      of the Network Element"
        ::= { tl1CmdsTableEntry 1 } tl1CmdsAid       OBJECT-TYPE
        SYNTAX        OctetString
        MAX-ACCESS    read-only
```

```
        STATUS      current
        DESCRIPTION    "This attribute gives info about the access identifier
              of the tl1Cmds"
        ::= { tl1CmdsTableEntry 2 } tl1CmdsAttrListId    OBJECT-TYPE
        SYNTAX      OctetString
        MAX-ACCESS    read-only
        STATUS      current
        DESCRIPTION    "This attribute gives info about the attrNameListId
              of the tl1Cmds table "
        ::= { tl1CmdsTableEntry 3 } tl1CmdsAttrValues    OBJECT-TYPE
        SYNTAX      OctetString
        MAX-ACCESS    read-write
        STATUS      current
        DESCRIPTION    "This gives the attributeValues of tl1Cmds table"
        ::= { tl1CmdsTableEntry 4 }

--thresholdsTable thresholdsTable OBJECT-TYPE
        SYNTAX      SEQUENCE OF ThresholdsTableEntry
        MAX-ACCESS    not-accessible
        STATUS      current
        DESCRIPTION    "This Table has the details of thresholds.This
              is mapped to OT_PSMT_THRESHOLDS table in
              database."
        ::= {network 14} thresholdsTableEntry OBJECT-TYPE
        SYNTAX      ThresholdsTableEntry
        MAX-ACCESS    not-accessible
        STATUS      current
        DESCRIPTION    "This attribute is the conceptual row of the
              thresholdsTable "
        INDEX     {
                  thresholdsNeId,
                      thresholdsAid,
                  thresholdsAttrListId
                  }
        ::= {thresholdsTable 1}

ThresholdsTableEntry ::= SEQUENCE{
                  thresholdsNeId      INTEGER,
                  thresholdsAid       OctetString,
                  thresholdsAttrListId    OctetString,
```

```
                thresholdsAttrValues    OctetString
            } thresholdsNeId      OBJECT-TYPE
    SYNTAX         INTEGER (0..10000)
    MAX-ACCESS     read-only
    STATUS         current
    DESCRIPTION    "This attribute gives info about the unique id
            of the Network Element"
    ::= {thresholdsTableEntry 1 } thresholdsAid       OBJECT-TYPE
    SYNTAX         OctetString
    MAX-ACCESS     read-only
    STATUS         current
    DESCRIPTION    "This attribute gives info about the access
            identifier of threshold table"
    ::= { thresholdsTableEntry 2 } thresholdsAttrListId    OBJECT-TYPE
    SYNTAX         OctetString
    MAX-ACCESS     read-only
    STATUS         current
    DESCRIPTION    "This attribute gives info about the
            attrNameListId of thresholds "
    ::= { thresholdsTableEntry 3 } thresholdsAttrValues    OBJECT-TYPE
    SYNTAX         OctetString
    MAX-ACCESS     read-write
    STATUS         current
    DESCRIPTION    "This gives the attributeValues of thresholds"
    ::= { thresholdsTableEntry 4 }

--groupsTable groupsTable             OBJECT-TYPE
    SYNTAX         SEQUENCE OF GroupsTableEntry
    MAX-ACCESS     not-accessible
    STATUS         current
    DESCRIPTION    "This Table has the details of groups.This
            is mapped to OT_GROUPS table in database."
    ::= {network 15} groupsTableEntry        OBJECT-TYPE
    SYNTAX         GroupsTableEntry
    MAX-ACCESS     not-accessible
```

```
STATUS      current
DESCRIPTION   "This attribute is the conceptual row of the
        groupsTable "
INDEX     {
        groupsId
        }
::= {groupsTable 1}

GroupsTableEntry ::= SEQUENCE{
    groupsId              OctetString,
    groupsDescription     OctetString,
    groupsFdn             OctetString,
    groupsParentFdn       OctetString,
    groupsParentGroupId   OctetString,
    groupsSeverity        Integer32
        } groupsId              OBJECT-TYPE
    SYNTAX      OctetString
    MAX-ACCESS  read-only
    STATUS      current
    DESCRIPTION   "This attribute is mapped to id of ot_groups table in the database."
::= { groupsTableEntry 1 } groupsDescription     OBJECT-TYPE
    SYNTAX      OctetString
    MAX-ACCESS  read-only
    STATUS      current
    DESCRIPTION   "This attribute is mapped to description attribute of ot_groups table in
the database."
        ::= { groupsTableEntry 2 } groupsFdn             OBJECT-TYPE
    SYNTAX      OctetString
    MAX-ACCESS  read-only
    STATUS      current
    DESCRIPTION   "This attribute is mapped to fdn attribute of
                            ot_groups table in the database."
        ::= { groupsTableEntry 3 } groupsParentFdn       OBJECT-TYPE
    SYNTAX      OctetString
    MAX-ACCESS  read-only
    STATUS      current
    DESCRIPTION   "This attribute is mapped to parent_fdn attribute of ot_groups table in
the database."
        ::= { groupsTableEntry 4 }
```

```
groupsParentGroupId    OBJECT-TYPE
    SYNTAX       OctetString
    MAX-ACCESS   read-only
    STATUS       current
    DESCRIPTION  "This attribute is mapped to parent_group_id
                    attribute of ot_groups table in the database."
    ::= { groupsTableEntry 5 } groupsSeverity    OBJECT-TYPE
    SYNTAX       Integer32
    MAX-ACCESS   read-only
    STATUS       current
    DESCRIPTION  "This attribute is mapped to severity attribute
                    of ot_groups table in the database."
    ::= { groupsTableEntry 6 }

-- Notification group contains all the attribute definitions
-- which are sent with the events. It also contains the definitions of
--notications specific to network elements.

events    OBJECT-IDENTITY
    STATUS       current
    DESCRIPTION "Notification group contains all the attribute
                    definitions which are sent with the events.It also
                    contains the definitions of notications specific to
                    network elements"
    ::= {network 16 } moduleDefGrp    OBJECT-IDENTITY
        STATUS       current
    DESCRIPTION "The subtree from which the module identity for
                    the clock devices is assigned "
    ::= { network 17 }

END
```

Events MIB

```
NOTIFY-MIB DEFINITIONS ::= BEGIN
IMPORTS
    events FROM TIMEPICTRA-MIB

OBJECT-TYPE, Integer32, IpAddresss,accessible-for-notify FROM
SNMPv2-SMI
    MODULE-IDENTITY,OBJECT-GROUP FROM SNMPv2-CONF;
```

```
eventmibModule    MODULE-IDENTITY
    LAST-UPDATED    "200101162300"
    ORGANIZATION    " Symmetricom Inc"
    CONTACT-INFO    ""
    DESCRIPTION     "This is a module definition for the attributes sent
        with the SNMP Notifications.It also contains the
        definitions of notications specific to network elements."

::= {moduleDefGrp 1}

--*****************************************************************
-- Notify Group-Specifies the objects to be sent with the Notification
--***************************************************************** eventId     OBJECT-TYPE
    SYNTAX    Integer32
    MAX-ACCESS  accessible-for-notify
    STATUS    current
    DESCRIPTION "This attribute gives the unique event identifier in the
        database."
    ::= { events 1} eventNeId    OBJECT-TYPE
    SYNTAX    Integer32
    MAX-ACCESS  accessible-for-notify
    STATUS    current
    DESCRIPTION "This attribute gives the network element's unique Id in
        database."
    ::= { events 2} eventAid    OBJECT-TYPE
    SYNTAX    OctetString
    MAX-ACCESS  accessible-for-notify
    STATUS    current
    DESCRIPTION "This attribute gives the access identifier of the network
        element"
    ::= { events 3} eventNeAddress  OBJECT-TYPE
    SYNTAX    OctetString
    MAX-ACCESS  accessible-for-notify
    STATUS    current
    DESCRIPTION "This attribute gives the ipaddress of Network element."
    ::= { events 4} conditionType  OBJECT-TYPE
```

```
    SYNTAX    OctetString
    MAX-ACCESS  accessible-for-notify
    STATUS    current
    DESCRIPTION "This attribute gives the information about the event
            condtion"
    ::= { events 5} trapSeverity OBJECT-TYPE
        SYNTAX      Integer32
        MAX-ACCESS accessible-for-notify
        STATUS      current
        DESCRIPTION "This attribute gives the severity information about
                    the event.The mapping in the database as follows:
                        0->none,1->nonalarm, 2->minor,3->major,4->critical,5-
                        >clear and by default the agent will follow the same
                        pattern.But the manager is allowed to change this
                        mapping by propriately setting the value of
                        'trapToSeverityMap' attribute. For
                    example, let us say TimePictra reports severity as 2
                        for minor,3 for major and 4 for critical and manager
                        want to see 1 for critical,2 for major and 3 for
                        minor. Then thevalue of 'trapToSeverityMap' will be
        2->3,3->2,4->1,*->0
        Any severity which is not present will be send as
            0(ie default value.
        Agent will only send the integer values.The
                        interpretation of these values is left to the
                        manager"
        ::={ events 6 } eventNature   OBJECT-TYPE
    SYNTAX    INTEGER{
                serviceaffective(0),
                servicenotaffective(1)
            }
    MAX-ACCESS  accessible-for-notify
    STATUS    current
    DESCRIPTION "This attribute gives the nature of an event."
    ::= { events 7 } message   OBJECT-TYPE
    SYNTAX    OctetString
    MAX-ACCESS  accessible-for-notify
    STATUS    current
    DESCRIPTION "This attribute gives the description of an event."
    ::= { events 8}
```

```
timeStamp    OBJECT-TYPE
  SYNTAX    OctetString
  MAX-ACCESS  accessible-for-notify
  STATUS    current
  DESCRIPTION "This attribute gives the time of occurence of the event."
  ::= { events 9} eventNeClli   OBJECT-TYPE
  SYNTAX    OctetString
  MAX-ACCESS  accessible-for-notify
  STATUS    current
  DESCRIPTION "This attribute gives the selection name of the NE"
  ::= { events 10} eventRemarks  OBJECT-TYPE
  SYNTAX    OctetString
  MAX-ACCESS  accessible-for-notify
  STATUS    current
  DESCRIPTION "This attribute gives information about remarks
        pertaining to event"
  ::= { events 11} probableCause OBJECT-TYPE
        SYNTAX      Integer32
        MAX-ACCESS accessible-for-notify
        STATUS      current
        DESCRIPTION "This attribute gives the information about the cause
                of event.Some of the possible values of probable cause could be (taken
            from the standards)
          0->unknown
              1->adapterError,
                  2->applicationSubsystemFailure,
          3->bandwidthReduced,
                  4->callEstablishmentError,
                      5->communicationsProtocolError,
                  6->communicationsSubsystemFailure,
          7->configurationOrCustomizationError,
                  8->congestion,9->corruptData,
                  10->cpuCyclesLimitExceeded,
                  11->dataSetOrModemError,12->degradedSignal,
          13->dTE-DCEInterfaceError,
                  14->enclosureDoorOpen,15->equipmentMalfunction,
          16->excessiveVibration,17->fileError,18->fireDetected,
          19->floodDetected,20->framingError,
                  21->heatingOrVentilationOrCoolingSystemProblem,
          22->humidityUnacceptable,23->inputOutputDeviceError,
          24->inputDeviceError,25->lANError,26->leakDetected,
```

27->localNodeTransmissionError,28->lossOfFrame,
   29->lossOfSignal,30->materialSupplyExhausted,
31->multiplexerProblem,32->outOfMemory,
33->ouputDeviceError,34->performanceDegraded,
   35->powerProblem,36->pressureUnacceptable,
37->processorProblem,
   38->pumpFailure,39->queueSizeExceeded,
40->receiveFailure,
   41->receiverFailure,42->remoteNodeTransmissionError,
   43->resourceAtOrNearingCapacity,
44->responseTimeExcessive,
   45->retransmissionRateExcessive,46->softwareError,
   47->softwareProgramAbnormallyTerminated,
48->softwareProgramError,49->storageCapacityProblem,
50->temperatureUnacceptable,
   51->thresholdCrossed,52->timingProblem ,
53->toxicLeakDetected,
   54->transmitFailure,55->transmitterFailure,
   56->underlyingResourceUnavailable,57->versionMismatch,
   58->snmpTrapColdStart,59->snmpTrapWarmstart,
60->snmpTrapLinkDown
   61->snmpTrapLinkUp,62->snmpTrapAuthenticationFailure,
   63->snmpTrapEgpNeighborloss,
  64->snmpTrapEnterpriseSpecific
  65->snmpTrapLinkDown The manager is open to decide upon value this variable
      For different event types by appropriately setting
      value eventToProbableCauseMap'attribute.
For example, lets say there are three reported condition
      types(The actual number will be much more) which are
      INDISQ,OPCDNA and INPLOSS.If the manager wants
      probable cause 37 for INDISQ,33 for OPCDNA and 29 for
      INPLOSS, then the map will be INDISQ->37,OPCDNA-
      >33,INPLOSS->29,*->64
Agent will only send the integer values.The
      interpretation of these values is left to the manager
PROBABLECAUSE-DEFAULT: 64( snmpTrapEnterpriseSpecific ) "
::={ events 12 } alarmEventType OBJECT-TYPE
    SYNTAX    Integer32
    MAX-ACCESS accessible-for-notify
    STATUS    current
    DESCRIPTION "This attribute gives the information about the category
of event.Some of the possible values of alarmEventType could be (taken from the standards)
0->communicationsAlarm
1->environmentalAlarm
2->equipmentAlarm
    3->processingErrorAlarm
4->qualityofServiceAlarm
    The manager is open to decide upon value this variable for different
condition types by appropriately setting value of
    'alarmEventTypeMap' attribute
For example, lets say there are three reported condition types
The actual number will be much more) which are INDISQ,OPCDNA
and INPLOSS.If the manager wants alarmEventType 4 for INDISQ,
2 for OPCDNA and 0 for INPLOSS, then the map will be
INDISQ->4,OPCDNA->2,INPLOSS->0,*->0
Agent will only send the integer values.The interpretation
of these values is left to the manager ALARMEVENTTYPE-DEFAULT:2(equipmentAlarm)"
    ::={ events 13 } additionalText OBJECT-TYPE
        SYNTAX      OctetString
        MAX-ACCESS      accessible-for-notify
        STATUS      current
        DESCRIPTION "This attribute is meant to provide additional information
            related to an event"
    ::={ events 14 } attributeName   OBJECT-TYPE
    SYNTAX    OctetString
    MAX-ACCESS  accessible-for-notify
    STATUS    current
    DESCRIPTION "This is the name of the attribute."
    ::= { events 15 } oldAttributeValue   OBJECT-TYPE
    SYNTAX          OctetString
    MAX-ACCESS    accessible-for-notify
    STATUS          current
    DESCRIPTION     ""
    ::= { events 16 } newAttributeValue   OBJECT-TYPE
    SYNTAX          OctetString
    MAX-ACCESS    accessible-for-notify

```
STATUS        current
DESCRIPTION   ""
::= { events 17 } eventPort     OBJECT-TYPE
  SYNTAX      OctetString
  MAX-ACCESS  accessible-for-notify
  STATUS      current
  DESCRIPTION "This attribute gives info about the port number
              through which the communication with NE is done"
  ::= { events 18 } attrListId    OBJECT-TYPE
  SYNTAX      OctetString
  MAX-ACCESS  accessible-for-notify
  STATUS      current
  DESCRIPTION "This attribute gives info about the attrNameListId's
              of NE's"
  ::= { events 19 } errorMessage  OBJECT-TYPE
  SYNTAX      OctetString
  MAX-ACCESS  accessible-for-notify
  STATUS      current
  DESCRIPTION "This attribute gives the error message during a GET/SET"
  ::= { events 20 } agentDescription    OBJECT-TYPE
  SYNTAX      OctetString
  MAX-ACCESS  accessible-for-notify
  STATUS      current
  DESCRIPTION "This attribute gives the description about the agent"
  ::= { events 21 } eventGroupName  OBJECT-TYPE
  SYNTAX      OctetString
  MAX-ACCESS  accessible-for-notify
  STATUS      current
  DESCRIPTION "This attribute gives the groupname of the created/deleted
                        group"
  ::= { events 22 } eventFdn      OBJECT-TYPE
  SYNTAX      OctetString
  MAX-ACCESS  accessible-for-notify
  STATUS      current
  DESCRIPTION "This attribute gives the fdn of the created/deleted
                        group"
```

::= { events 23 } systemAlarm   NOTIFICATION-TYPE
   OBJECTS   {eventNeId,eventId,eventNeClli,eventNeAddress,eventAid,
      eventPort,trapSeverity,eventNature,conditionType,
         message,timeStamp,probableCause,alarmEventType,
    additionalText}
   STATUS   current
   DESCRIPTION "This notification type is used by agent to emit traps
       if the following conditions are satisfied.
    (1). The event should be generated by timePictra system.
    (2). The event severity should be either major,minor or critical."

::= { events 24 } systemEvent   NOTIFICATION-TYPE
   OBJECTS   {eventNeId,eventId,eventNeClli,eventNeAddress,eventAid,
      eventPort,trapSeverity,eventNature,conditionType,
         message,timeStamp,probableCause,alarmEventType,
    additionalText}
   STATUS   current
   DESCRIPTION "This notification type is used by agent to emit traps
       if the following conditions are satisfied.
(1). The event should be generated by timePictra system.
(2). The event severity should be either none,noalarm or clear. "

::= { events 25 } neAlarm   NOTIFICATION-TYPE
   OBJECTS   {eventId,eventNeId,eventNeClli,eventNeAddress,eventAid,
      eventPort,trapSeverity,eventNature,conditionType,
      message,timeStamp,probableCause,alarmEventType,
      additionalText}
   STATUS   current
   DESCRIPTION "This notification type is used by agent to emit traps
       if the following conditions are satisfied.
    (1). The event should be generated by the Network Element
    (2). The event severity should be either major,minor or
       critical. "

::= { events 26 } neEvent   NOTIFICATION-TYPE
   OBJECTS   {eventId,eventNeId,eventNeClli,eventNeAddress,eventAid,
      eventPort,trapSeverity,eventNature,conditionType,
      message,timeStamp,probableCause,alarmEventType,
      additionalText}
   STATUS   current DESCRIPTION "This notification type is used by agent to emit traps
if the following conditions are satisfied.
(1). The event should be generated by the Network Element.
(2). The event severity should be either none,noalarm or clear."

::= { events 27 } neCreation    NOTIFICATION-TYPE
    OBJECTS    {eventNeId,eventNeAddress,eventNeClli}
    STATUS    current
    DESCRIPTION "This trap is used to report creation of a new NE in the
        database"

::= { events 28 } neDeletion    NOTIFICATION-TYPE
    OBJECTS    {eventNeId,eventNeAddress,eventNeClli}
    STATUS    current
    DESCRIPTION "This trap is used to report deletion of an NE from the
        database"

::= { events 29 } attributeValueChange NOTIFICATION-TYPE
    OBJECTS         {eventId,eventNeId,eventNeAddress,eventNeClli,
                    eventAid,
            attrListId,attributeName,oldAttributeValue,
            newAttributeValue}
    STATUS              current
    DESCRIPTION    "This notification type is used by agent to
                    emit traps if the following conditions are
                    satisfied.
                    (1).Set on a single attribute in the database
            "
::= { events 30 } allAttributeValuesChange    NOTIFICATION-TYPE
    OBJECTS                     {eventNeId,eventNeAddress,eventNeClli,eventAid
                                            attrListId,newAttributeValue}
    STATUS                      current
    DESCRIPTION                 "This notification type is used by agent
        to emit traps if the following conditions
                    are satisfied.
                (1).Set on a list of attrbutes by the
                        manager "
    ::= { events 31 } errorMesg    NOTIFICATION-TYPE

```
  OBJECTS   {eventNeId,eventAid,attrListId,eventNeClli,errorMessage }
  STATUS    current
  DESCRIPTION "This trap will be emitted by the agent when the GES
                     interface
        to timepictra returns an error during GET/SET "
  ::= { events 32 } agentUp     NOTIFICATION-TYPE
  OBJECTS   { agentDescription }
  STATUS    current
  DESCRIPTION "This trap will be emitted by the agent once it
                     Complete its initialization"
  ::= { events 33 } agentDown   NOTIFICATION-TYPE
  OBJECTS   { agentDescription }
  STATUS    current
  DESCRIPTION "This trap will be emitted by the agent before it goes
           down"
  ::= { events 34 } groupCreation   NOTIFICATION-TYPE
  OBJECTS   {eventGroupName,eventFdn}
  STATUS    current
  DESCRIPTION "This trap is used to report creation of a new Group in
                     the database"

::= { events 35 } groupDeletion   NOTIFICATION-TYPE
  OBJECTS   {eventGroupName,eventFdn}
  STATUS    current
  DESCRIPTION "This trap is used to report deletion of a Group in the
           database"

::= { events 36 }

END
```

PRACTICAL APPLICATIONS OF THE INVENTION

A practical application of the invention that has value within the technological arts is a generic SNMP management base used to interface between an EMS and a NMS. Further, the invention is useful in conjunction with integration of new types of network elements into an existing network (such as are used for the purpose of data communications), or in conjunction with integration of a new EMS managed sub-network into an existing network. There are virtually innumerable uses for the invention, all of which need not be detailed here.

ADVANTAGES OF THE INVENTION

The invention provides a system and method that can generically represent the physical elements of a network The invention allows the representation of all types of hardware and physical network elements utilizing a single generic data structure. This data structure, which in one embodiment is described using the SNMP protocol, allows a network management system to interface with only one type of management information base, saving time and money when either a new element management system, or a new type of physical network element, is added to a network.

One aspect of the present invention provides an important technical advantage in that any network element from any vendor is capable of being represented. Another advantage provided by certain aspects of the present invention is that a network management system must no longer be adopted to interface with many different types of management information bases. Still another technical advantage provided by certain aspects of the present invention is that all the information and data for each of the elements in a network will be covered.

All the disclosed embodiments of the invention disclosed herein can be made and used without undue experimentation in light of the disclosure. The invention is not limited by theoretical statements recited herein. Although the best mode of carrying out the invention contemplated by the inventor is disclosed, practice of the invention is not limited thereto. Accordingly, it will be appreciated by those skilled in the art that the invention may be practiced otherwise than as specifically described herein. Further, variation may be made in the steps or in the sequence of steps composing methods described herein. Further, although the generic management information base described herein can be a separate module, it will be manifest that it may be integrated into the system with which it is associated.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Specific embodiments of the invention are differentiated by the appended dependent claims and their equivalents.

What is claimed is:

1. A method, comprising
associating a plurality of physical elements of a network with at least one element management system;
providing a network management system; and
providing a generic management information base interfacing between the at least one element management system and the network management system, wherein the generic management information base includes a first data structure and a second data structure, the first data structure including at least one attribute common to each of the plurality of physical elements associated with the element management system, the second data structure including at least one value representing at least one of the plurality of physical elements,
wherein i) the first data structure and the second data structure are associated using a common link field and ii) the first data structure and the second data structure are generic, and
wherein the common link field defines in part a key.

2. The method of claim 1, wherein
the first data structure includes at least one set of associated names and default values for the at least one attribute.

3. The method of claim 1, further comprising
modeling at least one set of runtime data of the at least one physical element of the network in the generic management information base.

4. The method of claim 3, further comprising
updating the at least one set of runtime data during operation of the network.

5. The method of claim 1, further comprising
managing the network utilizing the generic management information base.

6. The method of claim 1, further comprising
optimizing the network utilizing the generic management information base.

7. The method of claim 1, further comprising
monitoring the network using the generic management information base.

8. The method of claim 1, wherein
the generic management information base is described using SNMP.

9. The method of claim 1 characterized in that a Attr_Name_List_Id third field, links a Cards data structure to an Attr_Name_List table, and together a set of three fields Ne_Id, Aid and Attr_Name_List_Id, define the key to find a unique record in the Cards data structure.

10. The method of claim 9 characterized in that as the key is not just one field, any number of records may exist for the "DCD-MIS" Attr_Name_List_Id, for different access ids (Aid) and for different network elements.

11. An apparatus, comprising
a network including a plurality of physical elements;
at least one element management system associated with at least one of the plurality of physical elements;
a network management system; and
at least one management information base interfacing between the at least one element management system and the network management system, the at least one management information base configured to interface between each of the at least one element management systems and the network management system, characterized in that the at least one management information base includes a generic management information base having a first data structure and a second data structure, the first data structure including at least one attribute common to each of the plurality of physical elements associated with the at least one element management system, and the second data structure including at least one value representing at least one of the plurality of physical elements, wherein i) the first data structure and the second data structure are associated using a common link field and ii) the first data structure and the second data structure are generic, and wherein the common link field defines in part a key.

12. The apparatus of claim 11, wherein
the first data structure includes at least one set of associated names and default values for the at least one attribute.

13. The apparatus of claim 11, wherein
the at least one generic management information base includes at least one data structure configured to store at least one set of runtime data associated with the at least one physical element.

14. The apparatus of claim 13, wherein
the generic management information base is operable to be updated during operation of the managed network.

15. The apparatus of claim 11, wherein
the network management system is configured to optimize the network using the generic management information base.

16. The apparatus of claim 11, wherein
the network management system is configured to monitor the network utilizing the generic management information base.

17. The apparatus of claim 11, wherein
the generic management information base is described using SNMP.

18. The method of claim 11 characterized in that a Attr_Name_List_Id_third field, links a Cards data structure to an Attr_Name_List table, and together a set of three fields Ne_Id, Aid and Attr_Name_List_Id, define the key to find a unique record in the Cards data structure.

19. The method of claim 18 characterized in that as the key is not just one field, any number of records may exist for the "DCD-MIS" Attr_Name_List_Id, for different access ids (Aid) and for different network elements.

20. A method, comprising
providing a network including a plurality of physical elements associated with at least one element management system;
representing the network with at least one generic management information base, wherein the generic management information base includes a first data structure and a second data structure; the first data structure including at least one attribute common to each of the plurality of physical elements associated with the at least one element management system, the second data structure including at least one value representing at least one of the plurality of physical elements; and
populating the at least one generic management information base with at least one value pertaining to each of the plurality of physical elements, wherein i) the first data structure and the second data structure are associated using a common link field and ii) the first data structure and the second data structure are generic, and wherein the common link field defines in part a key.

21. The method of claim 20, wherein
the generic management information base is described using SNMP.

22. The method of claim 20 characterized in that a Attr_Name_List_Id third field, links a Cards data structure to an Attr_Name_List table, and together a set of three fields, Ne_Id, Aid and Attr_Name_List_Id, define the key to find a unique record in the Cards data structure.

23. The method of claim 22 characterized in that as the key is not just one field, any number of records may exist for the "DCD-MIS" Attr_Name_List_Id, for different access ids (Aid) and for different network elements.

24. A method, comprising
providing a network including a plurality of physical elements associated with at least one element management system;
providing a network management system;
providing a generic management information base interfacing between the at least one element management system and the network management system, wherein the generic management information base includes a first data structure and a second data structure, the first data structure including at least one attribute common to each physical element associated with the element management system, the second data structure including at least one value representing at least one physical element;
modeling at least one set of runtime data corresponding to at least one of the plurality of physical elements;
utilizing the network management system to read the at least one set of runtime data and improve the performance of the network; and
updating the at least one set of runtime data to reflect the current state of the network,
wherein i) the first data structure and the second data structure are associated using a common link field and ii) the first data structure and the second data structure are generic, and
wherein the common link field defines in part a key.

25. The method of claim 24, wherein
the generic management information base is described using SNMP.

26. The method of claim 24 characterized in that a Attr_Name_List_Id third field, links a Cards data structure to an Attr_Name_List table, and together a set of three fields Ne_Id, Aid and Attr_Name_List_Id, define the key to find a unique record in the Cards data structure.

27. The method of claim 26 characterized in that as the key is not just one field, any number of records may exist for the "DCD-MIS" Attr_Name_List_Id, for different access ids (Aid) and for different network elements.

* * * * *